Figure 1:
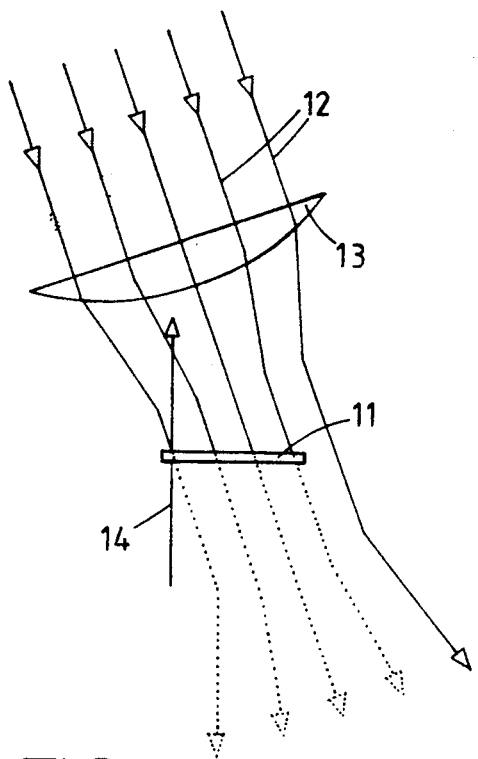

United States Patent [19]
Cook et al.

[11] Patent Number: 5,265,479
[45] Date of Patent: Nov. 30, 1993

[54] MICRO RESONATOR

[75] Inventors: Alan J. Cook, Moseley; Stephen D. Hawker, Sutton Coldfield, both of England

[73] Assignee: Lucas Industries Public Limited Company, West Midlands, United Kingdom

[21] Appl. No.: 954,406

[22] Filed: Sep. 29, 1992

Related U.S. Application Data

[63] Continuation of Ser. No. 595,095, Oct. 9, 1990, abandoned.

Foreign Application Priority Data

Oct. 17, 1989 [GB] United Kingdom ............... 8923374

[51] Int. Cl.$^5$ ............................................. G01L 1/10
[52] U.S. Cl. ............................ 73/862.59; 73/702; 73/705
[58] Field of Search .................... 73/862.59, 702, 705

[56] References Cited

U.S. PATENT DOCUMENTS

| | | | |
|---|---|---|---|
| 4,345,482 | 8/1982 | Adolfson et al. | 73/862.59 |
| 4,567,451 | 1/1986 | Greenwood | 73/862.59 |
| 4,743,752 | 5/1988 | Olsen et al. | 73/862.59 |
| 4,884,450 | 12/1989 | Greenwood et al. | 73/702 |
| 4,942,767 | 7/1990 | Haritonidis et al. | 73/705 |
| 4,972,076 | 11/1990 | Wilson | 73/862.59 |

FOREIGN PATENT DOCUMENTS

| | | | |
|---|---|---|---|
| 2146120 | 4/1985 | United Kingdom | 73/862.59 |
| 2185106 | 7/1987 | United Kingdom | |
| 2213588 | 8/1989 | United Kingdom | |

Primary Examiner—Richard E. Chilcot, Jr.
Assistant Examiner—Elizabeth L. Dougherty
Attorney, Agent, or Firm—Dvorak and Traub

[57] ABSTRACT

An optically driven microresonator sensor comprising a sensor member having a vibratory bridge onto which a light beam is directed at a non-zero angle relative to a normal to said bridge, the light beam causing the bridge to oscillate at its resonant frequency, in use, in the direction of said normal, between a first position, where most of the incident light is reflected by the bridge to a light intensity measuring system, and a second position, where most of the incident light is not intercepted by said bridge, so that the reflected incident light sensed by said light intensity measuring system is reduced, the resonant frequency of oscillation of the bridge thus determined from said system, being dependent upon the nature of an applied force, such as stress, exerted on the sensor member.

3 Claims, 2 Drawing Sheets

MICRO RESONATOR

This application is a continuation of application Ser. No. 07/595,095, filed Oct. 9, 1990, abandoned.

This invention relates to a sensor, and in particular an optically driven microresonant sensor.

U.K. Patent specification 2185106A discloses a sensor having a thin beam of rigid material which is arranged to vibrate relative to its mounting assembly as a result of a light beam being incident normally on its outer surface. The beam outer surface has an optically reflective layer which intercepts approximately half the area of the incident light beam, which is focused by a lens into a focused spot, which is itself incident on the beam outer surface at a position displaced from the neutral beam axis. The remainder of the beam surface illuminated by the spot is covered by a layer of an optically absorbing material which absorbs the greater part of the light incident upon it.

In use, the absorbing material is heated by the focused spot, causing thermal conduction to the beam material underneath. This localised thermal expansion of the beam causes a bending movement in the beam which results in a smaller area of absorbing material being exposed to the spot, so that the heating becomes less. The beam thus cools and returns to its original position, where the cycle begins again. The beam vibration can become self-sustaining. By measuring the reflective light from the beam during oscillation, the oscillation frequency can be evaluated. The sensor can be used as a force, pressure or temperature sensor by arranging for changes in the selected parameter to change oscillation frequency.

One disadvantage of the described sensor of this prior art specification is its direction of vibration, which is not about the easiest axis of movement, and is thus inefficient for the coupling of energy into that mode of oscillation. This is a result of both the beam mask design and the angle of incidence of the light beam, which is normal to the surface of the beam. The use of micromachined silicon or quartz to gain the benefits of mass fabrication and material interfacing, creates a fundamental problem in achieving the direction of movement required for detection of oscillation of the structure.

An object of the invention is to provide a sensor in which the above mentioned disadvantages of the prior art is overcome.

According to the present invention there is provided a sensor comprising an element having a resonant frequency dependent upon the nature of an applied force, a light source arranged to direct light onto said element, and means for determining the resultant resonant frequency, wherein the light is arranged to be directed onto said element at a non-zero angle of incidence relative to a normal thereto, so that the amount of light reflected by the element is dependent on its vibrational displacement at a resonant frequency.

As used herein, 'light' includes the range of electromagnetic radiation from ultra-violet to infra-red inclusive.

Figure 2:
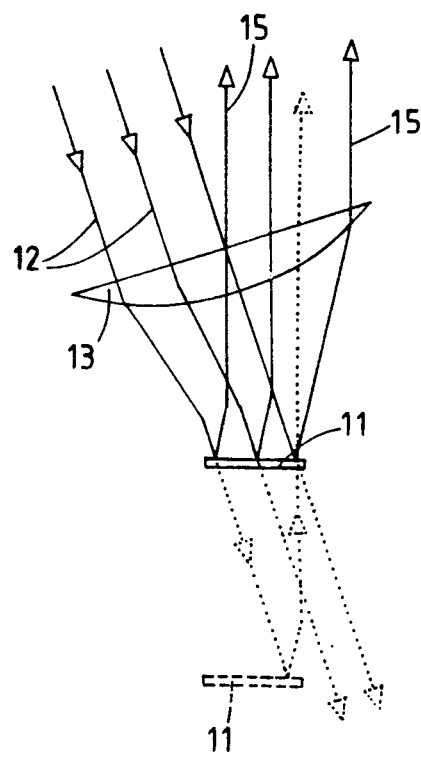
Figure 3:
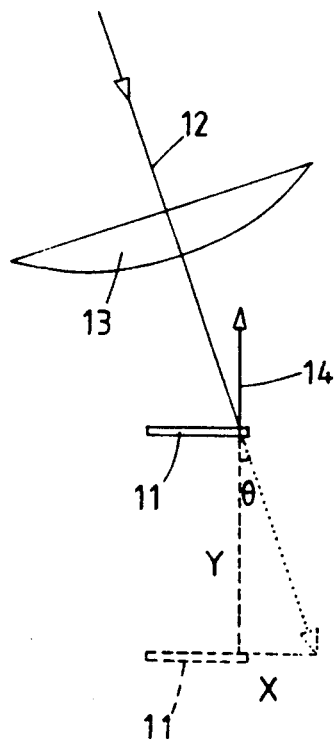
Figure 4:
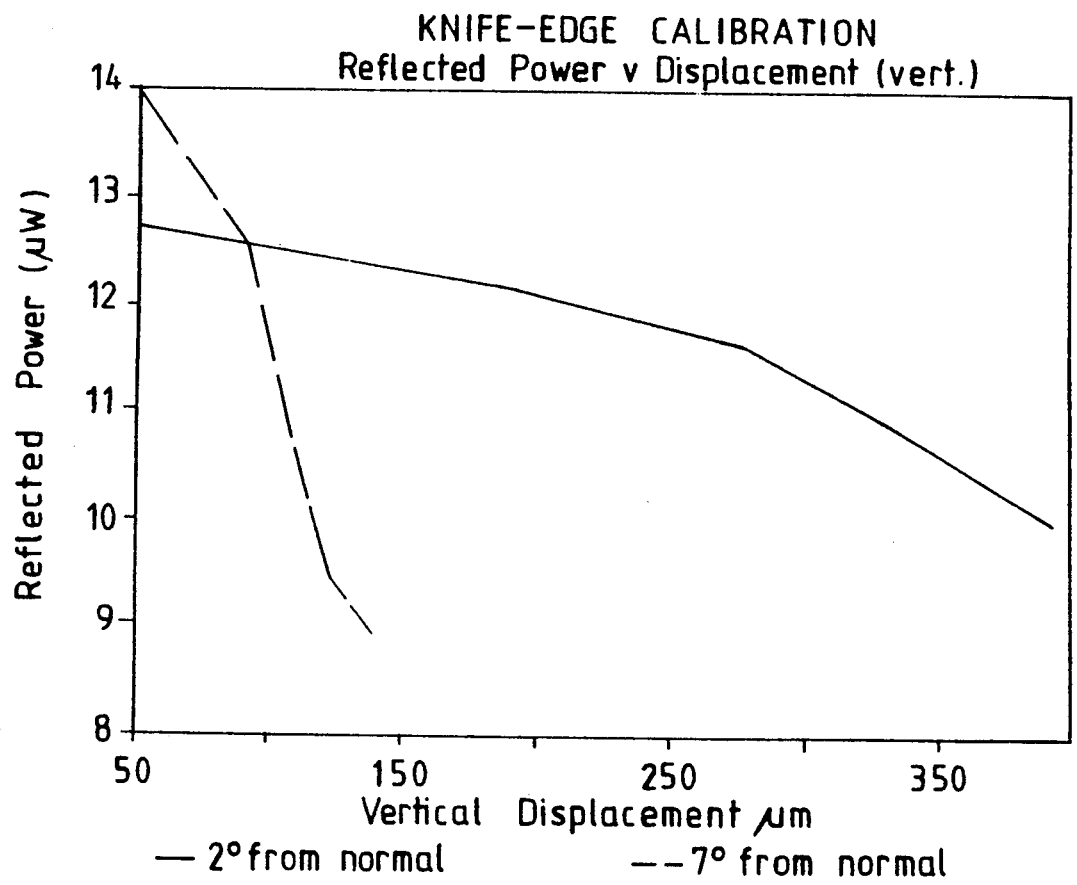
Figure 5:
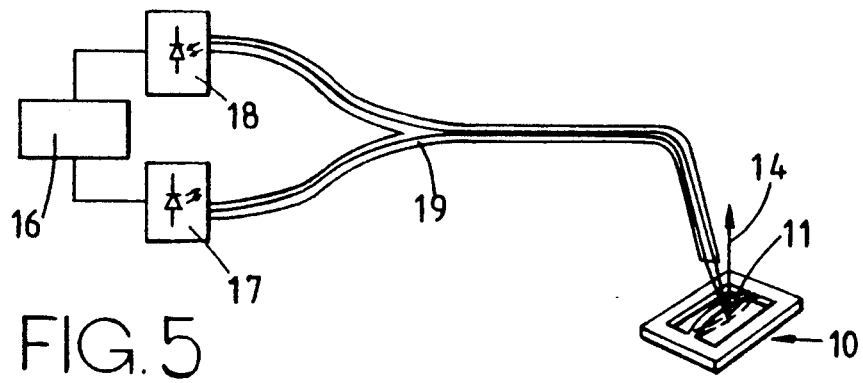

The invention will now be described, by way of invention, with reference to the accompanying drawings, in which:

FIG. 1 is a schematic, diagrammatic view of a sensor of the invention, showing a light source directed onto an element, FIG. 2 is a view like FIG. 1, showing the reflection of light by the element in two alternative positions, FIG. 3 shows how for movement of the element between its alternative positions of FIG. 2, there is a relative lateral displacement between the incident light and the element, FIG. 4 is a graph showing power of the reflected light against vertical displacement of said element for two different light source angles of incidence, and FIG. 5 shows an alternative embodiment of the invention employing an optical fibre to supply the incident light and receive the reflected light, with means for determining the resonant frequency of the sensor from incident and reflected light readings respectively.

Figure 5A:
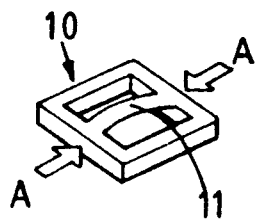

FIG. 5a shows an enlargement of the sensor shown in FIG. 5.

A sensor of the invention has a vibratory element forming part of a sensor member, and this element has a resonance frequency which is dependent upon the nature of a force applied to said member. Typically the force applied could be a stress force applied generally longitudinally of said vibratory element. However, the sensor member could be adapted, for example, to be a pressure sensor or a temperature sensor, where the resonance frequency depends upon the pressure or temperature applied to the sensor member.

FIG. 5a is an enlarged view of a typical sensor member 10 of a sensor of the invention. The member 10 has a generally square or rectangular frame between two opposed sides of which extends a vibratory element in the form of a bridge, beam or knife-edge 11. This bridge 11 can be made to vibrate by directing a beam of light onto it. The whole of the upper surface of the bridge is coated with a light absorbing material for enhancing the conversion of light energy to heat at said upper surface. The differential thermal expansion between the top and bottom surface of the bridge induces a bending movement causing the bridge to flex. Subsequent cooling followed by further heating causes the bridge to vibrate. Vibration occurs in a direction normal to the plane of said frame, i.e., in the direction of least mechanical resistance for the bridge 11. The resonant frequency of the bridge will vary in accordance with the stress applied to the sensor member, as indicated by the arrows A. Thus by measuring the resonance frequency in suitably controlled systems, very accurate measurements can be made.

The theory of the sensor of the invention will be explained with reference to FIGS. 1 to 3.

FIG. 1 shows a continuous beam of incident light 12, for example from a He-Ne laser. The beam is focused down by a lens 13 to provide a Gaussian beam waist region, where the sensor 10 is disposed, only the bridge 11 being shown in FIG. 1 for clarity. It is important to note that the beam is incident at a non-zero angle relative to a normal 14 to the bridge 11. In FIG. 1, the reflected path of light rays is also omitted for clarity. In this 'rest' or first position of the bridge, the whole, or most, of the light beam is intercepted by the bridge and reflected back through the lens, as shown in FIG. 2, where the whole incident beam profile is not shown for the sake of clarity. The reflected rays are denoted by numeral 15. These reflected rays are received by a light intensity measuring system (not shown).

As the bridge 11 absorbs energy from the incident light beam, it moves from the position shown in full in FIG. 2 to the position shown in dashed lines, this vibratory movement being in the direction of the normal 14.

As a result of the inclination of the light beam to the normal, the proportion of the light beam intercepted by the bridge in its second position will decrease, as shown in FIG. 2. This reduced amount of light reflected by the bridge 11 passes through the lens 13 and is received by the light intensity measuring system. The system will thus register a decreased light intensity with displacement of the bridge from its first to its second position, and the resonant frequency and amplitude of oscillation of the bridge can be determined from these readings as the bridge freely vibrates between said two positions, producing a sinusoidal oscillation.

FIG. 3 illustrates how, in effect, the vertical vibratory movement Y of the bridge introduces a horizontal component of movement X between the bridge and the optical beam with $X = Y \tan \theta$, where $\theta$ is the angle of incidence of the light source. In use, the sensor effectively operates partly ON or OFF, with part of the light beam wholly reflected or part of the light beam wholly missed by the sensor bridge.

Instead of the amount of reflected light decreasing as the bridge moves to its second position, the light intensity measuring system could be arranged to receive more light with the bridge in position 2 than position 1.

FIG. 4 shows graphically how the amount, and thus the power, of the reflected light varies as the bridge moves from its 'rest' or first position. As can be seen for an angle of incidence for the light beam of 2° from the normal, there is a relatively slow, but steady reduction in the reflected power as the bridge moves away. With an angle of incidence increased to 7°, the fall off is much more pronounced even before the movement has reached 150 μm, demonstrating the partly ON-OFF nature of the sensor referred to above, and thus its sensitivity. It is believed that the minimum workable angle is 2°. The maximum is likely to be of the order of 25°. Preferably the workable range is 10 to 15 degrees.

FIG. 5 shows an alternative form of the invention, where a light intensity measuring system 16 is connected to a continuous light source 17, such as a light-emitting diode or a laser diode, and a reflected light receiving diode 18 or the like. The light is coupled to and from the sensor member by means of an optical fibre 19 with a Y coupler at its one end. The Figure shows the direction of vibration of the bridge 11 along the normal 14, as described hereinbefore with reference to FIGS. 2 and 3.

The structure illustrated in FIG. 5 is relatively small. For instance, the bridge 11 may be of the order of 200 micrometers long, 10 micrometers wide, and 2 micrometers thick. The bridge is thus compatible with single-mode and multi-mode optical fibres, such as the fibre 19.

By means of a fusion splicer, the end of the optical fibre adjacent the bridge has been lensed to provide some degree of focus for the emitted light therefrom, this issuing as a cone.

An application of the invention is the measurement of small displacements associated with microresonator structures. The microresonant element may also be envisaged to self-oscillate using a light source arranged as described herein.

Compared to the prior art arrangement referred to, it is believed that a sensor of the invention has various advantages. Firstly a dual layer structure, i.e. absorptive/reflective, is not used, making the sensor member 10 both simpler and less expensive. Secondly the incident light beam impinges on the bridge at non-normal incidence, so that the detected signal changes as the bridge moves vertically and out of the path of the beam, the movement occurring, when excited, in its direction of least mechanical resistance, i.e. in a plane perpendicular to its thinnest cross-section.

Thirdly, the sensor operates so that the optical beam is either mostly intercepted or not by the bridge 11. The modulation depth will therefore be greater than a comparable sensor system relying on the difference in signals from a reflective region and an absorptive region. This is because an absorber has some reflection and a reflector some absorption. The efficiency and ease of excitation in terms of detected signal amplitude is thus higher with the sensor of the invention.

The system of the present invention employs a fundamentally different technique from that of the prior art referred to, in that the prior art relates to an absorb/reflect system whereas the invention uses the partial reflect/intersection of a light beam. The invention can be said to be one in which the beam has non-normal incidence and uses diffuse reflection components from the resonator surface. Also the multi-mode optical fibre provides a light source with optical beams comprising a range of incident angles.

Although no critical, the lens should be close to the sensor member, for example within 50–100 μm. Although a laser can be used to provide the light source, a ordinary source of light can be used, although here it would not be possible for the lens to produce a perfect spot of incident light on the bridge 11.

The invention is seen to be of particular use where highly accurate pressure sensors or accelerometers are required in an environment with temperatures in excess of 200° C. This optical type of sensor is not subject to changes in electrical characteristics which may result from high temperature environments.

We claim:

1. A sensor comprising:
    an element having a resonant frequency dependent upon the nature of an applied force,
    a light source arranged to direct light onto said element to cause said element to vibrate,
    means for determining the resultant resonant frequency,
    said element having a flat surface in a non-vibratory state of said element, said flat surface being all of the same material, said material being partially light absorbing,
    said light being arranged to be directed onto said flat surface of said element at a non-zero angle of incidence relative to a normal to said flat surface, so that the amount of light reflected by the element is dependent on its vibrational displacement at a resonant frequency,
    the light source causing said element to vibrate at a resonance frequency due to a photo-thermal effect in which the element alternately expands and contracts resulting from a variation in the amount of light received onto said element during vibration, wherein the light source as arranged to direct light onto said flat surface of said element.

2. A sensor according to claim 1, wherein said flat surface has at least three parallel normals to said flat surface, said normals lying in at least two different planes.

3. A sensor according to claim 1, wherein
    said light source has a central axis,
    said light being transmitted in the shape of a cone,
    said central axis of aid light source being arranged at a non-zero angle of incidence relative to said normals to said flat surface, so that the amount of light reflected by the element is dependent on its vibrational displacement at a resonant frequency.

* * * * *